(12) United States Patent
Yun et al.

(10) Patent No.: US 11,201,012 B2
(45) Date of Patent: Dec. 14, 2021

(54) MULTI-LAYERED CERAMIC CAPACITOR

(71) Applicant: SAMSUNG ELECTRO-MECHANICS CO., LTD., Suwon-si (KR)

(72) Inventors: Ki Myoung Yun, Suwon-si (KR); Jae Sung Park, Suwon-si (KR); Dong Jun Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 62 days.

(21) Appl. No.: 16/721,607

(22) Filed: Dec. 19, 2019

(65) Prior Publication Data

US 2020/0258684 A1 Aug. 13, 2020

(30) Foreign Application Priority Data

Feb. 13, 2019 (KR) .................. 10-2019-0016771
Jul. 1, 2019 (KR) .................. 10-2019-0078903

(51) Int. Cl.
*H01G 4/12* (2006.01)
*H01G 4/30* (2006.01)
*H01G 4/228* (2006.01)
*H01G 4/012* (2006.01)

(52) U.S. Cl.
CPC .......... *H01G 4/1209* (2013.01); *H01G 4/012* (2013.01); *H01G 4/228* (2013.01); *H01G 4/30* (2013.01)

(58) Field of Classification Search
CPC .................. C04B 35/4682; H01G 4/1227
See application file for complete search history.

(56) References Cited

U.S. PATENT DOCUMENTS

| 8,582,277 | B2 * | 11/2013 | Tanaka | H01G 4/1227 361/321.4 |
|---|---|---|---|---|
| 9,799,450 | B2 | 10/2017 | Oguni | |
| 10,358,388 | B2 * | 7/2019 | Yun | H01G 4/30 |
| 10,872,726 | B2 * | 12/2020 | Park | H01G 4/30 |
| 10,872,727 | B2 * | 12/2020 | Park | H01G 4/1227 |
| 2002/0072464 | A1 | 6/2002 | Nakamura et al. | |
| 2004/0038800 | A1 | 2/2004 | Horie et al. | |
| 2004/0145856 | A1 | 7/2004 | Nakamura et al. | |

(Continued)

FOREIGN PATENT DOCUMENTS

| CN | 1432548 A | 7/2003 |
|---|---|---|
| CN | 105556625 A | 5/2016 |

(Continued)

OTHER PUBLICATIONS

Korean Office Action dated Aug. 10, 2020 issued Korean Patent Application No. 10-2019-0078903 (with English translation).

(Continued)

*Primary Examiner* — Karl E Group
(74) *Attorney, Agent, or Firm* — Morgan, Lewis & Bockius LLP

(57) ABSTRACT

A multilayer ceramic capacitor includes a ceramic body having a dielectric layer disposed between two internal electrodes. The dielectric layer includes a plurality of dielectric grains. A grain boundary between at least two dielectric grains of the plurality of dielectric grains has a ratio Si/Ni of a weight of Si to a weight of Ni in the grain boundary that is at least 1 and 6 or less.

21 Claims, 6 Drawing Sheets

(56) References Cited

U.S. PATENT DOCUMENTS

| | | |
|---|---|---|
| 2006/0116273 A1 | 6/2006 | Ito et al. |
| 2006/0251927 A1 | 11/2006 | Umeda et al. |
| 2009/0128990 A1 | 5/2009 | Inoue et al. |
| 2012/0162858 A1* | 6/2012 | Tanaka ................. H01G 4/1227 361/321.4 |
| 2013/0050900 A1* | 2/2013 | Dogan .................... H01G 4/30 361/321.4 |
| 2016/0196919 A1* | 7/2016 | Oguni ............... C04B 35/62807 361/301.4 |
| 2017/0186548 A1* | 6/2017 | Sato ........................ H01G 4/30 |
| 2018/0204679 A1 | 7/2018 | Kwak et al. |
| 2018/0286586 A1 | 10/2018 | Jung et al. |
| 2019/0135701 A1* | 5/2019 | Yun ...................... H01G 4/1281 |

FOREIGN PATENT DOCUMENTS

| | | |
|---|---|---|
| CN | 108335908 A | 7/2018 |
| CN | 108695073 A | 10/2018 |
| EP | 0423738 A2 | 4/1991 |
| JP | 2002-201065 A | 7/2002 |
| JP | 2004-224653 A | 8/2004 |
| JP | 2006-287046 A | 10/2006 |
| JP | 2008-109120 A | 5/2008 |
| JP | 2010-018480 A | 1/2010 |
| JP | 2012-129508 A | 7/2012 |
| JP | 2014-219685 A | 11/2014 |
| KR | 10-2006-0061245 A | 6/2006 |
| KR | 10-2019-0051156 A | 5/2019 |
| KR | 10-2019-0121143 A | 10/2019 |
| WO | 2008/010412 A1 | 1/2008 |

OTHER PUBLICATIONS

Japanese Office Action dated Dec. 15, 2020 issued in Japanese Patent Application No. 2019-230251 (with English translation).
Chinese Office Action dated May 7, 2021 issued in Chinese Patent Application No. 202010082253.3 (with English translation).

* cited by examiner

MULTI-LAYERED CERAMIC CAPACITOR

CROSS-REFERENCE TO RELATED APPLICATION(S)

This application claims benefit of priority to Korean Patent Application No. 10-2019-0016771 filed on Feb. 13, 2019 in the Korean Intellectual Property Office, and No. 10-2019-0078903 filed on Jul. 1, 2019 in the Korean Intellectual Property Office, the disclosure of which is incorporated herein by reference in its entirety.

BACKGROUND

1. Field

The present disclosure relates to a multilayer ceramic capacitor capable of improving reliability.

2. Description of Related Art

Generally, electronic components using ceramic materials such as capacitors, inductors, piezoelectric devices, varistors, thermistors, or the like, may include a ceramic body formed of a ceramic material, internal electrodes disposed inside the body, and external electrodes disposed on a surface of the ceramic body so as to be connected to the internal electrodes.

Recently, while electronic products have been designed to have reduced sizes and multifunctionality, chip components have also been reduced in size and have had a variety of functions implemented therein. Accordingly, there has been a demand for a multilayer ceramic capacitor having a reduced size and high capacitance.

For example, to simultaneously implement a multilayer ceramic capacitor having a reduced size and high capacitance, thicknesses of internal dielectric layers and electrode layers may need to be reduced such that an increased number of the internal dielectric layers and electrode layers may be stacked. Generally, a thickness of a dielectric layer is around 0.7 μm, and techniques to further decrease a thickness of a dielectric layer have been continuously developed.

As described above, with the miniaturization of the multilayer ceramic capacitor, dielectric breakdown is accelerated in a thin dielectric layer, and ensuring reliability is difficult.

In order to address the above-described problems, research into a dielectric composition has been conducted, but research into composition and microstructure control for a dielectric grain boundary is insufficient.

Deterioration of a dielectric grain in the thin dielectric layer occurs when oxygen vacancies formed in the dielectric grain move toward a negative electrode (-electrode) and are accumulated at an interface of the negative electrode (-electrode), such that an activation energy of the grain boundary may be lowered and tunneling may occur.

Therefore, reliability may be improved by increasing insulation resistance of the grain boundary in order to prevent deterioration of the dielectric grain and increase the insulation resistance. Thus, research into grain boundaries is needed.

SUMMARY

An aspect of the present disclosure is to provide a multilayer ceramic capacitor. The multilayer ceramic capacitor includes a ceramic body having a dielectric layer disposed between internal electrodes, wherein the dielectric layer includes dielectric grains, and a grain boundary between at least two of the dielectric grains has a ratio Si/Ni of a weight of Si to a weight of Ni in the grain boundary that is at least 1 and 6 or less.

According to another aspect of the present disclosure, a multilayer ceramic capacitor includes a plurality of first internal electrodes and a plurality of second internal electrodes that are alternately stacked with each other with dielectric layers therebetween. Each dielectric layer includes a plurality of dielectric grains with a grain boundary therebetween, the grain boundary includes Ni and Ti, and a ratio Ni/Ti of a weight of Ni to a weight of Ti in the grain boundary is 0.1 or less.

According to a further aspect of the present disclosure, a multilayer ceramic capacitor includes a plurality of first internal electrodes and a plurality of second internal electrodes that are alternately stacked with each other with dielectric layers therebetween. Each dielectric layer includes a plurality of dielectric grains with a grain boundary therebetween, and the grain boundary has a thickness of 0.7 nm to 1.5 nm.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
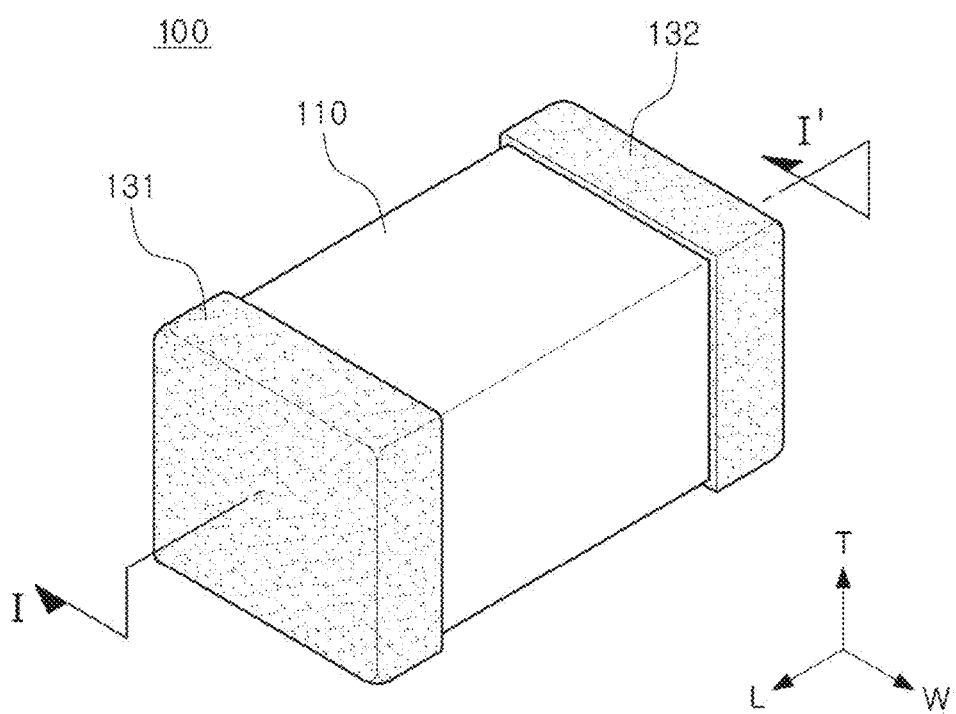
FIG. 1 is a schematic perspective view illustrating a multilayer ceramic capacitor according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings maybe exaggerated for clarity of description, and elements indicated by the same reference numeral are same elements in the drawings.

The present disclosure relates to a multilayer ceramic capacitor. FIG. 1 is a schematic perspective view illustrating a multilayer ceramic capacitor according to an embodiment of the present disclosure, FIG. 2 is a cross-sectional view taken along line I-I' of FIG. 1, and FIG. 3 is an enlarged view of 'P' region of FIG. 2.

Figure 2:
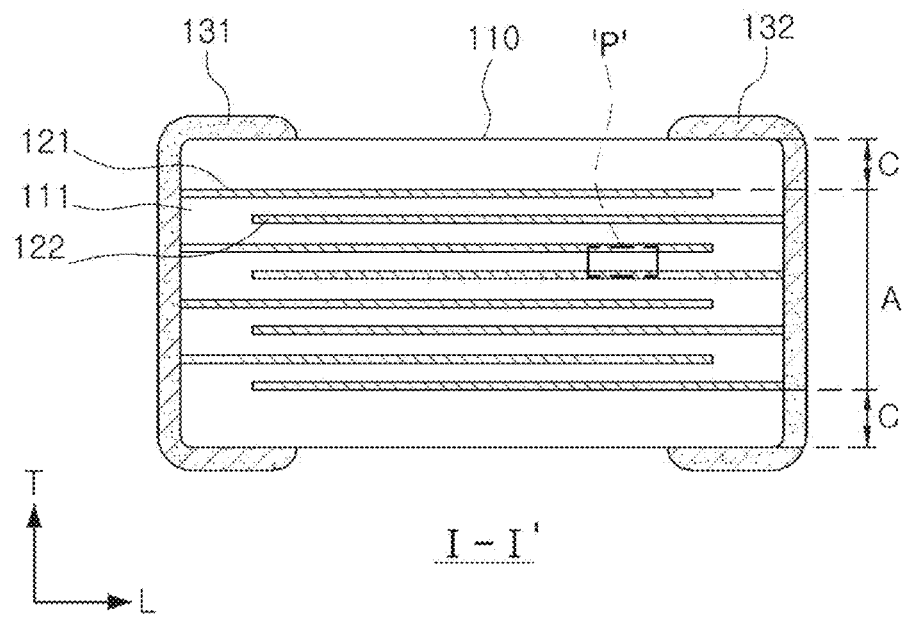
FIG. 2 is a cross-sectional view taken along line I-I' of FIG. 1.
Figure 3:
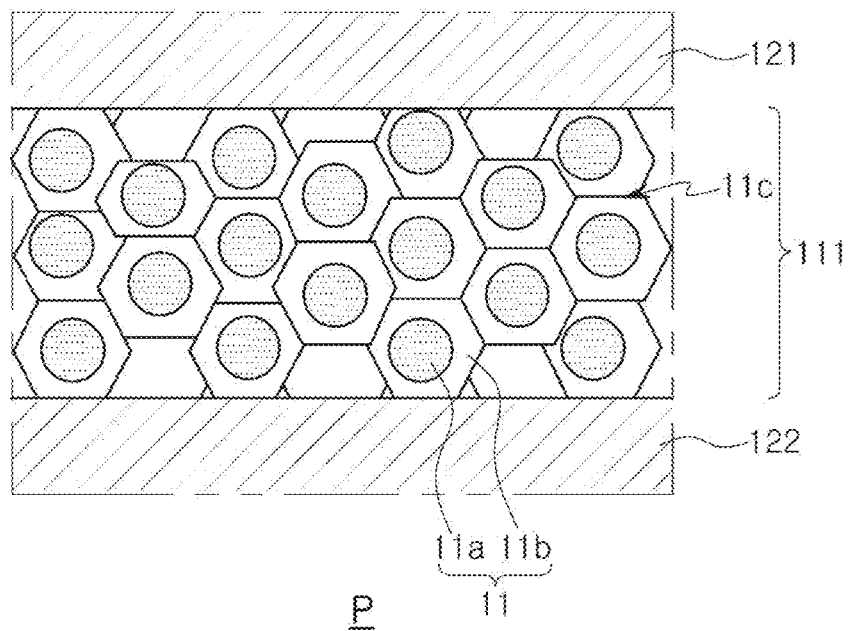
FIG. 3 is an enlarged view of region 'P' of FIG. 2.

Referring to FIGS. 1 to 3, a multilayer ceramic capacitor 100 according to an embodiment of the present disclosure may include a ceramic body 110 having a dielectric layer(s) 111 and internal electrodes 121 and 122.

A shape of the ceramic body 110 is not particularly limited, but may be a rectangular parallelepiped shape as shown in the figures.

In the multilayer ceramic capacitor 100 in an embodiment of the present disclosure, "a length direction" is an L direction, "a width direction" is a W direction, and "a thickness direction" is a T direction, as illustrated in FIG. 1. Here, the thickness direction may be the same as a stacking direction in which the dielectric layers are stacked.

A material forming the first and second internal electrodes 121 and 122 is not limited to any particular material. For example, the first and second internal electrodes 121 and 122 may be formed using a conductive paste including one or more elements among silver (Ag), lead (Pb), platinum (Pt), nickel (Ni), and copper (Cu).

According to an embodiment of the present disclosure, a material of the dielectric layer(s) 111 is not limited to any particular material as long as sufficient capacitance may be obtained therewith. For example, the material may be a barium titanate ($BaTiO_3$) powder.

As a material of the dielectric layer(s) 111, various ceramic additives, organic solvents, plasticizers, coupling agents, dispersing agents, and the like, may be added to a barium titanate ($BaTiO_3$) powder depending on an intended purpose.

The dielectric layers 111 may be in a sintered state, and the dielectric layers 111 maybe integrated with each other such that it may be difficult to identify boundaries between adjacent dielectric layers 111 with the naked eye.

The first and second internal electrodes 121 and 122 may be formed between adjacent ones of the dielectric layers 111, and the internal electrodes 121 and 122 may be formed in the ceramic body through a sintering process.

Referring to FIG. 3, the dielectric layer(s) 111 include dielectric grain(s) 11, and a grain boundary 11c is present between at least two or more dielectric grains of the dielectric grains 11. A Si/Ni ratio in the grain boundary 11c may satisfy 1 to 6. For example, a ratio of a weight of Si to a weight of Ni in the grain boundary 11c may be 1 or more and 6 or less.

The dielectric grains 11 have a perovskite structure represented by $ABO_3$.

The A may include one or more elements selected from a group consisting of barium (Ba), strontium (Sr), lead (Pb), and calcium (Ca), but is not limited thereto.

The B is not particularly limited, and may be any material that can be located at a B site in the perovskite structure, and may include one or more elements selected from a group consisting of, for example, titanium (Ti) and zirconium (Zr).

In the dielectric grain, one or more rare earth elements are dissolved to include one or more elements selected from a group consisting of $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), and $Ba_m(Ti_{1-x}Zr_x)O_3$ ($0.995 \leq m \leq 1.010$, $x \leq 10$), or may include one or more elements selected from a group consisting of $Ba_mTiO_3$ ($0.995 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), and $Ba_m(Ti_{1-x}Zr_x)O_3$ ($0.995 \leq m \leq 1.010$, $x \leq 0.10$), but is not limited thereto.

According to an embodiment of the present disclosure, the dielectric layer(s) 111 may include a non-reducible dielectric composition that can be sintered in a reducing atmosphere. Hereinafter, each ingredient of a dielectric composition for forming the dielectric layer 111 including the dielectric grain 11 will be described in more detail.

a) Base Material Powder

The dielectric ceramic composition may include a base material powder represented by $BaTiO_3$ According to an embodiment of the present disclosure, the base material powder may be represented by $BaTiO_3$, but is not limited thereto. For example, the base material powder may be represented by $(Ba_{1-x}Ca_x)(Ti_{1-y}Ca_y)O_3$, $(Ba_{1-x}Ca_x)(Ti_{1-y}Zr_y)O_3$, $Ba(Ti_{1-y}Zr_y)O_3$, or the like, formed by partially dissolving Ca, Zr, or the like.

The base material powder may include one or more elements selected from a group consisting of $BaTiO_3$, $(Ba_{1-x}Ca_x)(Ti_{1-y}Ca_y)O_3$ (where, x satisfies $0 \leq x \leq 0.3$, y satisfies $0 \leq y \leq 0.1$), $(Ba_{1-x}Ca_x)(Ti_{1-y}Zr_y)O_3$ (where, x satisfies $0 \leq x \leq 0.3$, y satisfies $0 \leq y \leq 0.5$), and $Ba(Ti_{1-y}Zr_y)O_3$ (where, y satisfies $0 < y \leq 0.5$), but is not limited thereto.

The base material powder is not particularly limited, but an average particle diameter of the base material powder may be 40 nm or more and 150 nm or less.

b) First Accessory Ingredient

According to an embodiment of the present disclosure, the dielectric ceramic composition includes as a first accessory ingredient an oxide or a carbonate including at least one or more elements among Mn, V, Cr, Fe, Ni, Co, Cu, and Zn, as a first accessory ingredient.

The oxide or carbonate containing at least one or more elements among Mn, V, Cr, Fe, Ni, Co, Cu, and Zn as the first accessory ingredient may be included in an amount of 0.05 to 2.0 mol %, based on 100 mol % of the base material powder.

The first accessory ingredient may serve to reduce a sintering temperature and improve high-temperature withstand voltage characteristics of the multilayer ceramic capacitor to which the dielectric ceramic composition is applied.

A content of the first accessory ingredient and contents of second to sixth accessory ingredients, to be described later, maybe based on 100 mol % of the base material powder, and in particular, may be defined as a mol % of a metal ion included in each of the accessory ingredients.

When the content of the first accessory ingredient is less than 0.05 mol %, a sintering temperature may increase, and high-temperature withstand voltage characteristics may be somewhat lowered.

When the content of the first accessory ingredient is 2.0 mol % or more, high-temperature withstand voltage characteristics and room temperature resistivity may be lowered.

In particular, the dielectric ceramic composition according to an embodiment of the present disclosure may include a first accessory ingredient having a content of 0.05 to 2.0 mol %, based on 100 mol % of the base material powder, and accordingly, a low-temperature sintering process may be performed, and high-temperature withstand characteristics may be obtained.

c) Second Accessory Ingredient

According to an embodiment of the present disclosure, the dielectric ceramic composition may include as a second accessory ingredient oxides or carbonates including a fixed-valence acceptor element Mg.

The dielectric ceramic composition may include 0.0 to 2.0 mol % of a second accessory ingredient, oxides or carbonates including a fixed-valence acceptor element Mg, based on 100 mol % of the base material powder.

The second accessory ingredient may be a fixed-valence acceptor element and compounds including the same, which may adjust a microstructure by inhibiting abnormal grain growth and impart non-reducible properties in the dielectric ceramic composition.

When the content of the second accessory ingredient exceeds 2.0 mol %, based on 100 mol % of the base material powder, the dielectric constant may be lowered, which is not preferable.

d) Third Accessory Ingredient

According to an embodiment of the present disclosure, the dielectric ceramic composition may include as a third accessory ingredient oxides or carbonates including at least one element among Y, Dy, Ho, Er, Gd, Ce, Nd, Pm, Eu, Tb, Tm, Yb, Lu and Sm.

According to an embodiment of the present disclosure, the dielectric ceramic composition may include as the third accessory ingredient oxides or carbonates including at least one element among Y, Dy, Ho, Er, Gd, Ce, Nd, Pm, Eu, Tb, Tm, Yb, Lu and Sm.

The third accessory ingredient may serve to prevent reliability degradation of the multilayer ceramic capacitor to which the dielectric ceramic composition is applied in an embodiment of the present disclosure.

When the content of the third accessory ingredient exceeds 4.0 mol %, the reliability may be lowered, a dielectric constant of the dielectric ceramic composition may be lowered, and the high-temperature withstand voltage characteristics may be deteriorated.

e) Fourth Accessory Ingredient

According to an embodiment of the present disclosure, the dielectric ceramic composition may include as a fourth accessory ingredient oxides or carbonates including Ba.

The dielectric ceramic composition may include 0.0 to 4.15 mol % of the fourth accessory ingredient, oxides or carbonates including Ba, based on 100 mol % of the base material powder.

A content of the fourth accessory ingredient may be based on the content of the Ba element included in the fourth accessory ingredient without distinguishing a form of addition such as oxides or carbonates.

The fourth accessory ingredient may serve to facilitate a sintering process, to control a dielectric constant, and the like, in the dielectric ceramic composition, and when a content of the fourth accessory ingredient exceeds 4.15 mol %, based on 100 mol % of the base material powder, a dielectric constant may decrease or a sintering temperature may increase.

f) Fifth Accessory Ingredient

According to an embodiment of the present disclosure, the dielectric ceramic composition may include a fifth accessory ingredient including one or more elements selected from a group consisting of oxides or carbonates of one or more elements of Ca, Ti, and Zr.

The dielectric ceramic composition may include 0.0 to 24.0 mol % of a fifth accessory ingredient, oxides or carbonates including at least one element among Ca, Ti, and Zr, based on 100 mol % of the base material powder.

A content of the fifth accessory ingredient may be based on a content of at least one or more elements among Ca, Ti, and Zr included in the fifth accessory ingredient without distinguishing a form of addition such as oxides or carbonates.

The fifth accessory ingredient may form a core-shell structure in the dielectric ceramic composition to improve the dielectric constant and improve the reliability. When the fifth accessory ingredient includes 24.0 mol % or less, based on 100 mol % of the base material powder, a dielectric ceramic composition having a high dielectric constant and a good high-temperature withstand voltage characteristic may be provided.

When a content of the fifth accessory ingredient exceeds 24.0 mol %, based on 100 mol % of the base material powder, a room temperature dielectric constant and a high-temperature withstand voltage characteristic may be lowered.

g) Sixth Accessory Ingredient

According to one embodiment of the present disclosure, the dielectric ceramic composition may include, as the sixth accessory ingredient, an oxide including at least one element of Si and Al or a glass compound including Si.

The dielectric ceramic composition may further include 0.0 to 8.0 mol % of the sixth accessory ingredient, an oxide including at least one element of Si and Al or a glass compound including Si, based on 100 mol % of the base material powder.

A content of the sixth accessory ingredient may be based on the content of at least one or more elements among Si and Al included in the sixth accessory ingredient without distinguishing a form of addition such as oxides or carbonates.

The sixth accessory ingredient may serve to lower a sintering temperature and improve a high-temperature withstand voltage characteristic of the multilayer ceramic capacitor to which the dielectric ceramic composition is applied.

When the content of the sixth accessory ingredient exceeds 8.0 mol %, based on 100 mol % of the base material powder, problems of degradation of sintering characteristics and density, creation of a secondary phase, and the like, may occur, which is not preferable.

According to an embodiment of the present disclosure, the dielectric layer includes dielectric grains 11, and a grain boundary 11c is present between at least two or more dielectric grains of the dielectric grains 11. A Si/Ni ratio in the grain boundary 11c may satisfy 1.0 to 6.0. For example, a ratio of a weight of Si to a weight of Ni in the grain boundary 11c may be 1 or more and 6 or less. The inventors have found that a work function of ingredients included in the dielectric layer may be controlled to enhance the insulation resistance of the grain boundary. The multilayer ceramic capacitor according to the present disclosure may effectively suppress conduction of leakage current by forming a high Schottky barrier by introducing an ingredient having a work function higher than the work function of the base material powder described above into the grain boundary. In addition, by adjusting composition ratios of Si and Ni having a high work function among component included in the grain boundary to the above-mentioned range, it is possible to prevent degradation of insulation resistance, particularly at a high-temperature, and to exhibit excellent breakdown voltage characteristics.

When the Si/Ni ratio in the grain boundary 11c is less than 1.0, the Si concentration in the grain boundary 11c is low, which lowers insulation resistance, and may deteriorate the reliability.

On the other hand, when the Si/Ni ratio in the grain boundary 11c exceeds 6.0, the Si concentration in the grain boundary 11c may be too high and the dielectric constant may be lowered.

The Si and/or Ni contents in the grain boundary 11c is not particularly limited as long as it satisfies the above-described Si/Ni ratio, and may uniformly be present in the grain boundary 11c.

The presence of Si and/or Ni uniformly in the grain boundary 11c means a content including an error range, for example, may mean that a ratio of a maximum content of Si-a minimum content of Si to an average content of Si, based on a weight, is 10% or less, and may be 0% or more. In addition, it may mean that a ratio of a maximum content of Ni-a minimum content of Ni to an average content of Ni, based on a weight, is 10% or less, and may be 0% or more.

A method of adjusting the Si/Ni ratio of the grain boundary is not particularly limited. As a method of adjusting the ratio of Si/Ni, for example, Si can control the content by controlling an addition amount of the sixth accessory ingredient, and Ni may be controlled by controlling a diffusion amount of Ni from an internal electrode by forming a Ti-rich phase by adding $TiO_2$ into the dielectric or eluting surface Ba of $BaTiO_3$. The Ti-rich phase may mean a state in which the content of Ti after adding $TiO_2$ in the dielectric or eluting the surface Ba of $BaTiO_3$ is increased compared to before adding $TiO_2$ in the dielectric or eluting the surface Ba of $BaTiO_3$.

According to an embodiment of the present disclosure, Ni included in the grain boundary 11c may be included in an amorphous state with Si. The term amorphous state may mean a state that is not a crystalline state, and may mean a state in which an arrangement state of atoms or molecules is disturbed, irregular, and lacks periodic regularity. When Ni is present as a metal, it acts as a conductor to cause deterioration of reliability of the multilayer ceramic capacitor. However, since Ni is present in an amorphous state with Si, a Schottky barrier due to a high work function may be formed.

In one example of the present disclosure, a size of the dielectric grain 11 included in the dielectric layer 111 may be 0.1 to 0.3 µm. When a size of the dielectric grain is less than 0.1 µm, a dielectric constant may be lowered, and when the size of the dielectric grain exceeds 0.3 µm, it may be difficult to thin the dielectric layer.

In one example, a thickness of a grain boundary 11c of the present disclosure may be 0.7 to 1.5 nm.

When the thickness of the grain boundary 11c satisfies 0.7 to 1.5 nm, the grain boundary 11c may be clearly identified in the dielectric layer 111, insulation resistance of the grain boundary 11c may be strengthened, and the reliability of the multilayer ceramic capacitor may be improved. When the thickness of the grain boundary 11c is less than 0.7 nm, the insulation resistance may be lowered and the reliability may be deteriorated. When the thickness of the grain boundary 11c exceeds 1.5 nm, the dielectric constant may be lowered.

In an example of the present disclosure, a ratio of Ni/Ti in the grain boundary 11c may be 0.1 or less. A lower limit of the ratio of Ni/Ti is not particularly limited, and may exceed for example, 0. When the ratio of Ni/Ti satisfies the range, a low DC-bias change may be exhibited. For example, a ratio Ni/Ti of a weight of Ni to a weight of Ti in the grain boundary 11c maybe such 0<Ni/Ti≤0.1.

According to an embodiment of the present disclosure, the dielectric grain 11 may have a core-shell structure.

Referring to FIG. 3, the dielectric grains 11 may have a core 11a and a shell 11b structure surrounding the core 11a.

The dielectric grains 11 may not include Si and/or Ni therein. The fact that a dielectric grain 11 does not include Si and/or Ni therein may mean Si and/or Ni are not present in the dielectric grain 11.

A multilayer ceramic capacitor 100 according to an embodiment of the present disclosure is an ultra-compact high-capacity product, and the thickness of the dielectric layer may be 1 µm or less. The thickness of the dielectric layers 111 may be arbitrarily changed according to a capacitance design of the electronic component, and the thickness may be 1 µm or less, 0.9 µm or less, 0.8 µm or less, or 0.7 µm or less, but is not limited thereto.

In addition, the thicknesses of the internal electrodes 121 and 122 maybe 1 µm or less. The thicknesses of the internal electrodes may be 1 µm or less, 0.9 µm or less, 0.8 µm or less, 0.7 µm or less, 0.6 µm or less, or 0.5 µm or less but is not limited thereto.

Since the multilayer ceramic capacitor 100 according to an embodiment of the present disclosure is an ultra-compact product, the thicknesses of the dielectric layers 111 and the internal electrodes 121 and 122 may be thinner than the product in the related art. In the multilayer ceramic capacitor to which the thin dielectric layer and the electrode layer are applied, an increase in defect rates due to deterioration of the dielectric layer is a problem. That is, in the case of the multilayer ceramic capacitor in the related art, since it is relatively thicker than the dielectric layer and the internal electrodes included in the multilayer ceramic capacitor of the present disclosure, even if the ratio of Si/Ni and the thickness of the grain boundary are not adjusted as in an embodiment of the present disclosure, it was not significant.

However, in a product to which a thin film dielectric layer and an internal electrode are applied as in an embodiment of the present disclosure, the thickness of the dielectric grain boundary and the Si/Ni ratio in the grain boundary 11c should be adjusted as described above to obtain the performance and durability characteristics described herein.

However, a meaning of the thin film does not mean that the thicknesses of the dielectric layers 111 and the internal electrodes 121 and 122 are necessarily within a predetermined range, but may be understood as a concept including a dielectric layer and internal electrodes which are thinner than the products in the related art.

In one example, the internal electrodes included in the multilayer ceramic capacitor of the present disclosure may include a first internal electrode and a second internal electrode disposed opposite each other with the dielectric layer interposed therebetween.

In addition, a multilayer ceramic capacitor according to an example of the present disclosure may be disposed outside of the above-described ceramic body, and may include a first external electrode electrically connected to the first internal electrode and a second external electrode electrically connected to the second internal electrode.

Referring to FIG. 2, a plurality of internal electrodes 121 and 122 formed in the ceramic body 110 may be configured such that one end thereof is exposed to one surface of the ceramic body 110 or another surface facing the one surface. The internal electrodes 121 and 122 may have a pair of a first internal electrode 121 and a second internal electrode 122 having different polarities. One end of each first internal electrode 121 may be exposed to one surface of the ceramic body, and one end of each second internal electrode 122 may be exposed to the other surface facing the one surface.

The one surface and the other surface, facing the one surface, of the ceramic body 110 may be provided with first and second external electrodes 131 and 132 thereon to be electrically connected to the first and second internal electrodes 121 and 122, respectively.

The first and second external electrodes 131 and 132 may be electrically connected to the first and second internal electrodes 121 and 122, respectively to form capacitance, and the second external electrode 132 may be connected to a potential different from a potential of the first external electrode 131.

A conductive material contained in the first and second external electrodes 131 and 132 is not particularly limited, but nickel (Ni), copper (Cu), or an alloy thereof can be used.

The thicknesses of the first and second external electrodes 131 and 132 may be appropriately determined according to uses, and the like, and is not particularly limited, but may be, for example, 10 to 50 μm.

The ceramic body 110 may include an active portion A forming capacitance and including the first internal electrode(s) 121 and second internal electrode (s) 122 disposed to oppose each other with the dielectric layer(s) 111 interposed therebetween, and a cover portion C formed in upper and lower portions of the active portion A.

The active portion A may be formed by repeatedly laminating a plurality of first and second internal electrodes 121 and 122 with dielectric layers 111 interposed therebetween.

The upper and lower cover portions C may have the same material and configuration as the dielectric layers 111 except that they do not have internal electrodes therebetween. That is, the upper and the lower cover portions C may include a ceramic material, for example, a barium titanate ($BaTiO_3$)-based ceramic material, and may be free of internal electrodes 121 or 122.

The upper and lower cover portions C may be formed by laminating a single dielectric layer or two or more dielectric layers on the upper and lower surfaces of the active portion A in a vertical or thickness direction, respectively, and the upper and lower cover portions C may basically prevent damage to the internal electrodes due to physical or chemical stress.

EXPERIMENTAL EXAMPLE

Hereinafter, the present disclosure will be described in more detail with reference to embodiments and comparative examples, but the scope of the present disclosure is not limited by the embodiments in order to facilitate specific understanding of the present disclosure.

Dy, Ba, Zr, Mn, V, Al, Ti, Si, and Mg as an accessory ingredient were added to a dielectric material powder containing a barium titanate ($BaTiO_3$) powder having an average particle diameter of 100 nm as a base material powder main ingredient in a form of oxides or carbonates. Samples 1 to 14 of Table 1 below used samples having the same contents except for the contents of a Ti oxide and a Si oxide. A dielectric slurry was prepared by adding additives, binders, organic solvents such as ethanol/toluene, and the like, and zirconia balls to the mixtures and performing a wet mixing process, to form a dielectric slurry.

The prepared dielectric slurry was applied onto a carrier film in a form of sheet having a thickness of several μms by a doctor blade method and dried to prepare a ceramic green sheet.

Next, an average size of a nickel particle may be within a range of 0.1 to 0.2 μm, and a conductive paste for internal electrodes including nickel powder of 40 to 50 parts by weight may be provided. The green sheet maybe coated with the conductive paste for forming internal electrodes through a screen printing process, the green sheets on which an internal electrode pattern is disposed may be stacked, and a laminate may be formed. The laminate may be compressed and cut out.

Thereafter, the binder was removed by heating the cut out laminate, the laminate was sintered in a high-temperature reducing atmosphere, thereby forming a ceramic body. In the sintering process, a sintering process was performed for two hours at 1100 to 1200° C. in a reducing atmosphere (atmosphere of 0.5% $H_2$/99.5% $N_2$, $H_2O/H_2/N_2$), and a re-oxidation was performed for three hours in a nitrogen ($N_2$) atmosphere at 1000° C., and heat treatment was performed.

In addition, a temperature was lowered rapidly in a lowering temperature process such that a size of the dielectric grains 11 in the dielectric layers 111 was uniform and the thickness of the grain boundary 11c was adjusted to 0.7 to 1.5 nm. Next, a termination process and electrode sintering was performed with a copper (Cu) paste for a sintered ceramic body to form external electrode(s), thereby manufacturing the multilayer ceramic capacitor.

With reference to Sample Nos. 1 to 18, i.e. specimens of a prototype multilayer ceramic capacitor (MLCC) thus completed (the prototype MLCC having 0603 size, a dielectric thickness of 0.7 μm or less, and 200 layers), a component of a boundary layer, breakdown voltage (BDV) scattering, high-temperature insulation resistance (IR) scattering, a DC-bias change rate, and the like were evaluated.

<Analysis of Ingredients of Boundary Layers>

① A thin film sample having a thickness of about 80 nm was prepared by performing an Ar milling treatment to a thin film sample for TEM observation prepared by focused ion beam (FIB) micro sampling of a STEM sample for boundary layer observation.

② An analysis was performed only for a boundary layer where there is no inclination on an incident electron beam.

③ A probe diameter of an electron beam was 0.5 nm or less.

④ FWHW of peaks shown in a line profile of a HAADF-STEM image (magnification ×2.25M) of the obtained boundary layer was measured and it was defined as a thickness of a boundary layer. A comparison analysis of the boundary layer was compared and analyzed for regions having the same thickness.

⑤ The component analysis of the boundary layer may be obtained by irradiating an electron beam to one point of the boundary layer satisfying the ② and ④ conditions above and performing EDS analysis. The measurement was performed by 20 points for each sample to calculate an average value.

<Measurement of Breakdown Voltages>

A breakdown voltage (BDV) was measured with a keithely meter, and a voltage value at the moment when a current value reached 10 mA was measured as a BDV value by applying a voltage from 0V to 1,0000V by a sweep method. When a minimum value of the measured BDV value for 1,000 samples is 80% or more, based on an average value, it was evaluated as good (○), when a minimum value of the measured BDV value for 1,000 samples is 60% or more, based on an average value, it was evaluated as normal (Δ), when a minimum value of the measured BDV value for 1,000 samples is less than 60%, it was evaluated as poor (X).

<Measurement of High-Temperature IR Scattering>

High-temperature IR scattering was measured by increasing a voltage step by 5V/μm at 150° C., and a resistance deterioration behavior was measured at intervals of 5 seconds for each step of 10 minutes.

When a minimum value of the resistance value measured for 1,000 samples is 80% or more, based on an average value, it was evaluated as good (○)), when a minimum value of the resistance value measured for 1,000 samples is 60% or more, based on an average value, it was evaluated as normal (Δ), and when a minimum value of the resistance value measured for 1,000 samples is less than 60%, based on an average value, it was evaluated as poor (X).

<Measurement of DC-Bias Change Rate>

A DC-bias change rate was measured after 60 seconds at a state in which DC 2V/ μm was applied by taking 1,000 samples.

Table 1 below shows the electrical characteristics of the multilayer ceramic capacitor chip according to Experimental Examples 1 to 18.

Figure 4:
FIGS. 4 and 5 are transmission electron microscope (TEM) analysis photographs according to an embodiment of the present disclosure.
Figure 5:
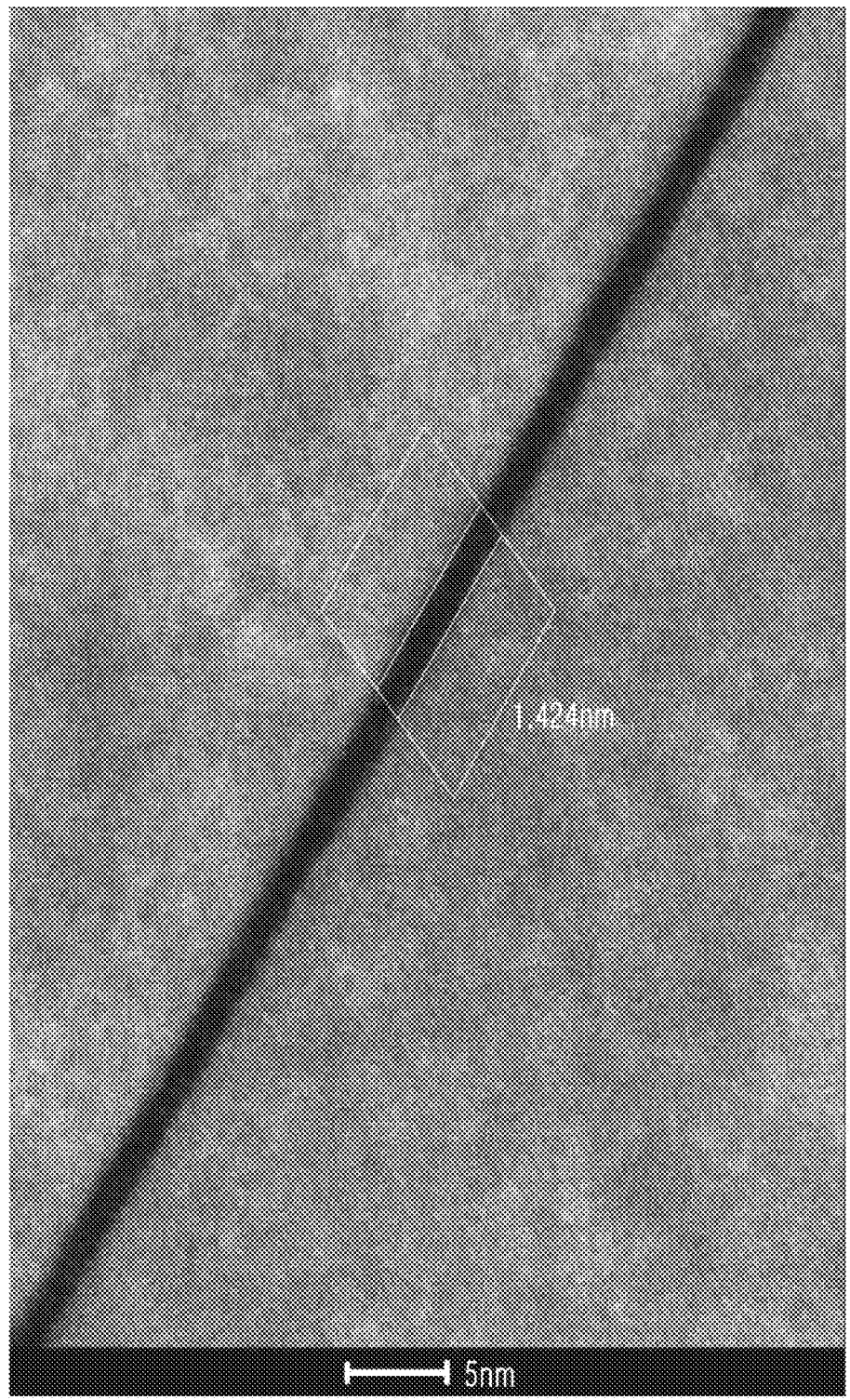

FIGS. 4 and 5 are transmission electron microscope (TEM) analysis photographs according to an embodiment of the present disclosure.

Figure 6:
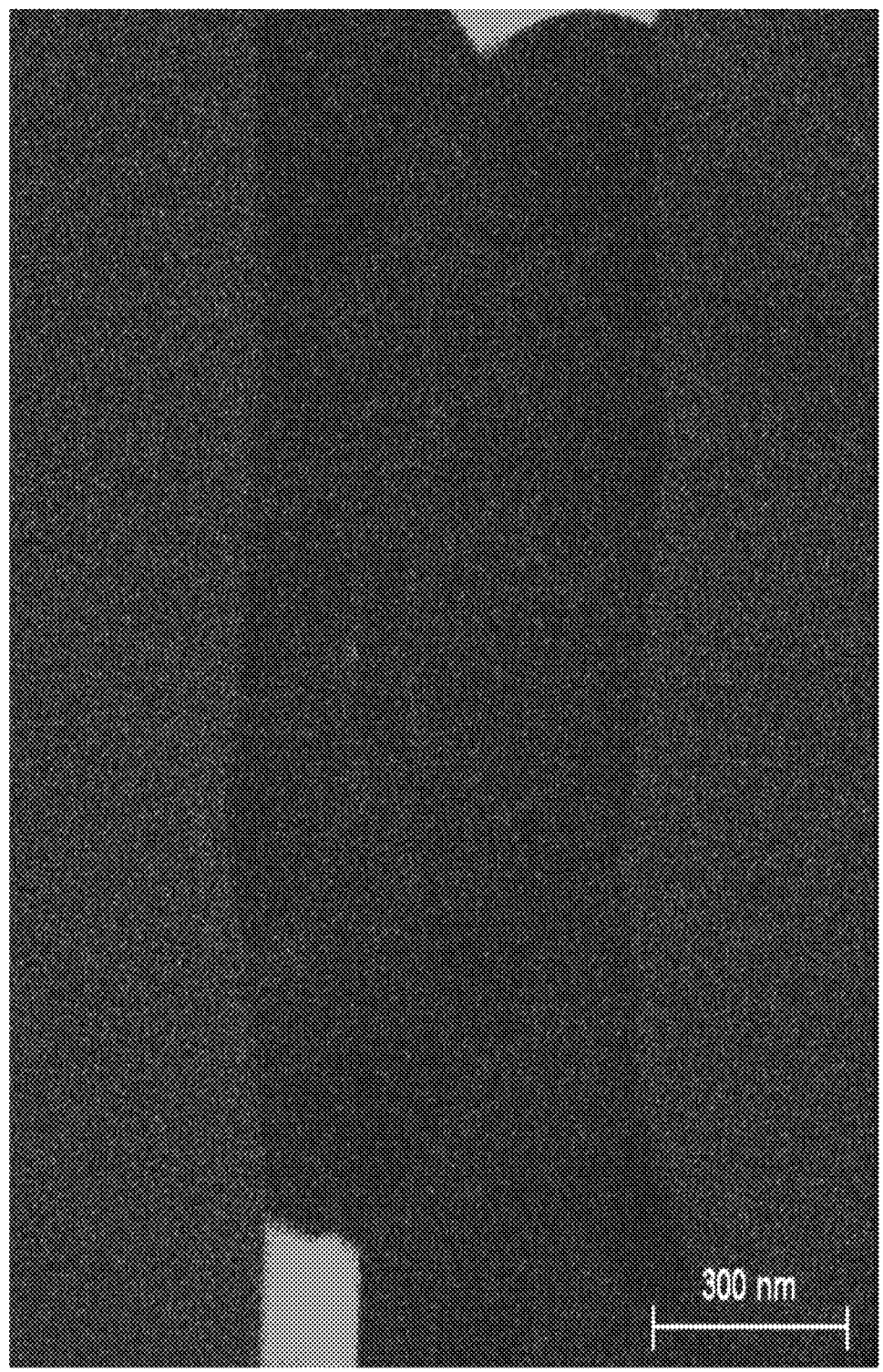
FIGS. 6 and 7 are transmission electron microscope (TEM) analysis photographs according to a comparative example of the present disclosure.
Figure 7:
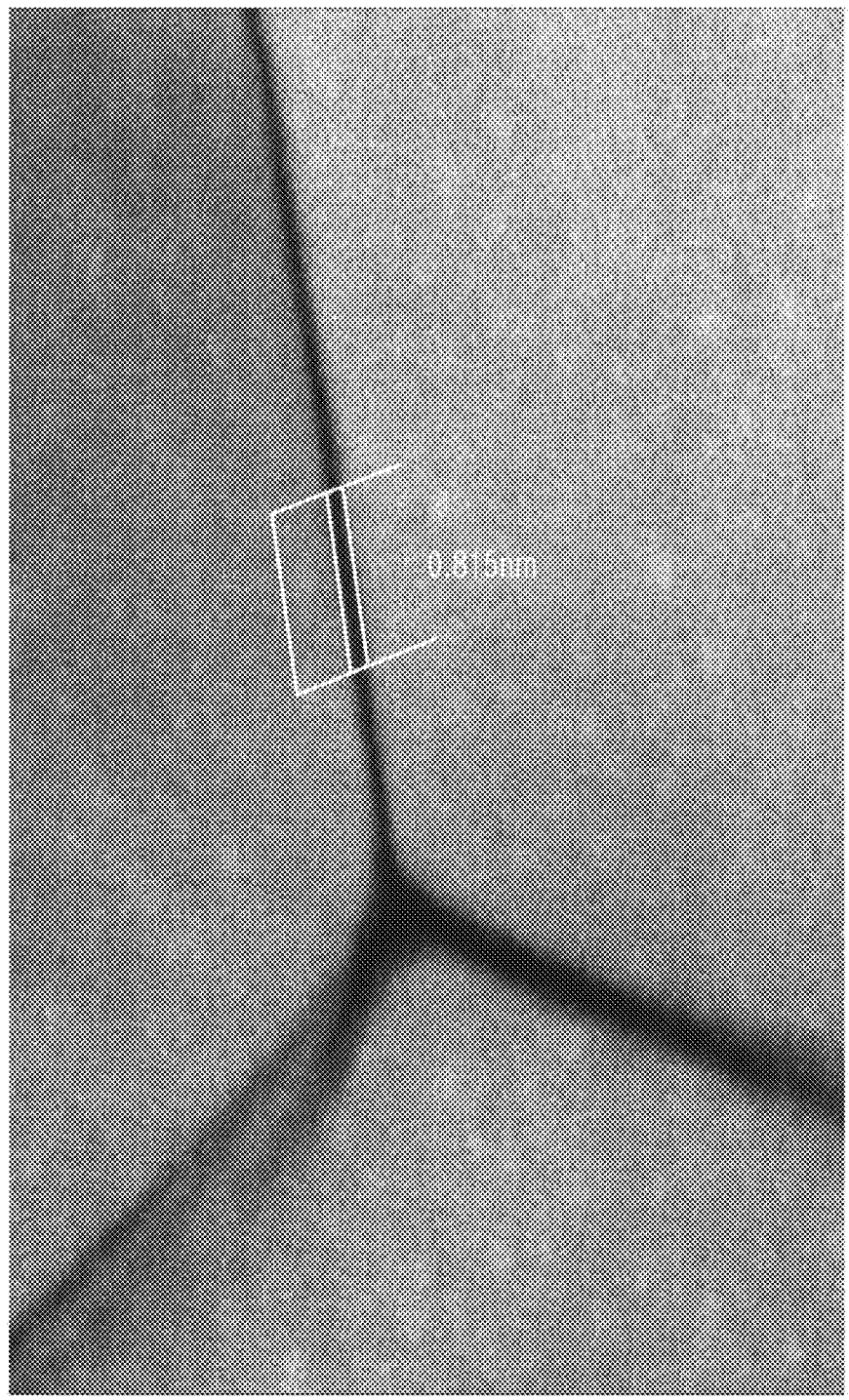

FIGS. 6 and 7 are transmission electron microscope (TEM) analysis photographs according to a comparative example of the present disclosure.

TABLE 1

| | Content ratio in grain boundary [wt %, %] | | | | | Characteristic | | |
|---|---|---|---|---|---|---|---|---|
| Sample No. | Si | Ni | Ti | Si/Ni (%) | Ni/Ti (%) | BDV scattering | High-temperature IR scattering | DC-bias change rate |
| 1* | 1.3 | 1.5 | 18 | 87% | 8.30% | Δ | X | Less than 40% |
| 2* | 1.4 | 1.5 | 14.5 | 93% | 10.30% | Δ | X | 40% or more |
| 3 | 1.7 | 0.8 | 18.4 | 213% | 4.30% | ○ | ○ | Less than 40% |
| 4 | 2.1 | 0.6 | 21 | 350% | 2.90% | ○ | ○ | Less than 40% |
| 5 | 2.2 | 0.4 | 15 | 550% | 2.70% | ○ | ○ | Less than 40% |
| 6 | 2.4 | 0.5 | 19 | 480% | 2.60% | ○ | ○ | Less than 40% |
| 7 | 2.8 | 0.6 | 20 | 467% | 3.00% | ○ | ○ | Less than 40% |
| 8 | 3 | 0.8 | 19.4 | 375% | 4.10% | ○ | ○ | Less than 40% |
| 9* | 3.5 | 0.5 | 19.6 | 700% | 2.60% | X | Δ | Less than 40% |
| 10 | 3.4 | 0.7 | 20.1 | 486% | 3.50% | ○ | ○ | Less than 40% |
| 11* | 3.8 | 0.6 | 20 | 633% | 3.00% | X | Δ | Less than 40% |
| 12 | 3.7 | 0.7 | 20.2 | 529% | 3.50% | ○ | ○ | Less than 40% |
| 13 | 4 | 1.5 | 15 | 267% | 10.00% | ○ | ○ | Less than 40% |
| 14 | 1.5 | 1.4 | 20.6 | 107% | 6.80% | ○ | ○ | Less than 40% |
| 15 | 4.5 | 0.9 | 20.8 | 500% | 4.30% | ○ | ○ | Less than 40% |
| 16* | 5.2 | 1.8 | 14.7 | 289% | 12.20% | ○ | Δ | 40% or more |
| 17* | 5.1 | 0.7 | 21.2 | 729% | 3.30% | X | Δ | Less than 40% |
| 18* | 6.2 | 1 | 15.2 | 626% | 6.50% | X | Δ | Less than 40% |

*Represents Comparative Example

Referring to Table 1 above, it can be confirmed that a ratio of Si/Ni in the grain boundary greatly affects BDV scattering, high-temperature IR scattering, and a DC-bias change rate.

Comparing Samples 1*, 2*, and 14, it can be confirmed that BDV scattering and high-temperature IR scattering were lowered when the ratio of Si/Ni is less than 1.0 (100%). Comparing Samples 5 and 18*, it can be confirmed that BDV scattering and high-temperature IR scattering were lowered, and the DC-bias change rate was 40% or more when the ratio of Si/Ni exceeds 6.0 (600%). That is, when the ratio of Si/Ni in the grain boundary satisfies the range of 1.0 (100%) to 6.0 (600%), it can be confirmed that the BDV scattering, the high-temperature IR scattering, and the DC-bias change rate were all excellent. Thus, the ratio of Si/Ni in the grain boundary included in the dielectric layer greatly affects electrical properties of the multilayer ceramic capacitor. When the above range is satisfied, it can be confirmed that reliability of the multilayer ceramic capacitor is improved by improving the insulation resistance and the breakdown voltage.

In addition, when comparing Samples 2* and 13, it can be confirmed that when a ratio of Ni/Ti exceeds 0.1 (10%), BDV scattering and high-temperature IR scattering are lowered, and a DC-bias change rate is 40% or more. That is, when the Ni/Ti ratio in the grain boundary is 0.1(100) or less, it can be confirmed that BDV scattering, high-temperature IR scattering and a DC-bias change rate were all excellent. Therefore, the ratio of Ni/Ti in the grain boundary included in the dielectric layer greatly affects the electrical properties of the multilayer ceramic capacitor, and it can be confirmed that the reliability of the multilayer ceramic capacitor is improved by improving the insulation resistance and the dielectric breakdown voltage when the above range is satisfied.

Referring to FIGS. 4 and 5, it can be seen that the grain boundary in the dielectric grain according to an embodiment of the present disclosure is uniformly and clearly identified, and a thickness thereof is also thick.

On the other hand, referring to FIGS. 6 and 7, it can be seen that the grain boundary in the dielectric grain according to the comparative example of the present disclosure is not clear or is formed to be thin, and insulation resistance is low.

According to the embodiment of the present disclosure, since the grain boundary is relatively clearly distinguished and the thickness thereof is also thick, it can be seen that reliability is excellent since insulation resistance is strengthened.

As set forth, according to an embodiment of the present disclosure, in the dielectric layer of the ceramic body which includes dielectric gains, by controlling the composition and the thickness of the dielectric grain boundary, it is possible to improve insulation resistance and dielectric breakdown voltage of the dielectric grain boundary to improve reliability, and a DC-bias characteristic may be improved.

While the example embodiments have been shown and described above, it will be apparent to those skilled in the art that modifications and variations could be made without departing from the scope of the present invention as defined by the appended claims.

What is claimed is:

1. A multilayer ceramic capacitor, comprising:
a ceramic body having a dielectric layer disposed between internal electrodes,
wherein the dielectric layer comprises a plurality of dielectric grains and a grain boundary between at least two dielectric grains of the plurality of dielectric grains,
wherein a ratio Si/Ni of a weight of Si to a weight of Ni in the grain boundary is at least 1 and 6 or less, and
wherein a ratio Ni/Ti of the weight of Ni to a weight of Ti in the grain boundary is 0.1 or less.

2. The multilayer ceramic capacitor of claim 1, wherein the Ni included in the grain boundary is in an amorphous state together with Si.

3. The multilayer ceramic capacitor of claim 1, wherein the dielectric grains in the dielectric layer have sizes of 0.1 µm to 0.3 µm.

4. The multilayer ceramic capacitor of claim 1, wherein the grain boundary has a thickness of 0.7 nm to 1.5 nm.

5. The multilayer ceramic capacitor of claim 1, wherein the dielectric grains in the dielectric layer have a core-shell structure.

6. The multilayer ceramic capacitor of claim 1, wherein the dielectric layer has a thickness of 1 or less between the internal electrodes.

7. The multilayer ceramic capacitor of claim 1, wherein the internal electrodes include a first internal electrode and a second internal electrode disposed to face each other with the dielectric layer interposed therebetween.

8. The multilayer ceramic capacitor of claim 7, further comprising:
a first external electrode electrically connected to the first internal electrode; and
a second external electrode electrically connected to the second internal electrode,
wherein the first and second external electrodes are disposed outside of the ceramic body.

9. The multilayer ceramic capacitor of claim 1, wherein the internal electrodes are stacked in an active portion of the ceramic body, and the ceramic body further includes a cover portion including dielectric layers disposed above a topmost internal electrode and below a bottom-most internal electrode of the internal electrodes in a stacking direction of the internal electrodes.

10. A multilayer ceramic capacitor comprising:
a plurality of first internal electrodes and a plurality of second internal electrodes that are alternately stacked with each other with dielectric layers therebetween,
wherein each dielectric layer comprises a plurality of dielectric grains with a grain boundary therebetween, and
the grain boundary includes Ni and Ti, and a ratio Ni/Ti of a weight of Ni to a weight of Ti in the grain boundary is 0.1 or less.

11. The multilayer ceramic capacitor of claim 10, wherein each dielectric layer has a thickness between adjacent first and second internal electrodes of 1 µm or less.

12. The multilayer ceramic capacitor of claim 11, wherein the grain boundary further includes Si, and a ratio Si/Ni of a weight of Si to the weight of Ni in the grain boundary is at least 1 and 6 or less.

13. The multilayer ceramic capacitor of claim 10, wherein the grain boundary has a thickness of 0.7 nm to 1.5 nm.

14. The multilayer ceramic capacitor of claim 10, wherein the dielectric grains of the dielectric layers have a structure including a core and a shell, and the core is free of Si and Ni.

15. The multilayer ceramic capacitor of claim 10, wherein the dielectric grains of the dielectric layers have a perovskite structure represented by $ABO_3$ where A includes at least one element selected from barium (Ba), strontium (Sr), lead (Pb), and calcium (Ca), and B includes at least one element selected from titanium (Ti) and zirconium (Zr).

16. The multilayer ceramic capacitor of claim 10, wherein the dielectric layers further include an oxide or a carbonate including at least one element selected from Mn, V, Cr, Fe, Ni, Co, Cu, and Zn,
the dielectric layers further include an oxide or carbonate including Mg,
the dielectric layers further include an oxide or carbonate including at least one element selected from Y, Dy, Ho, Er, Gd, Ce, Nd, Pm, Eu, Tb, Tm, Yb, Lu and Sm,
the dielectric layers further include an oxide or carbonate including Ba,
the dielectric layers further include an oxide or carbonate including Ca, Ti, and Zr, and
the dielectric layers further include an oxide including at Si or Al, or a glass compound including Si.

17. The multilayer ceramic capacitor of claim 10, wherein the Ni included in the grain boundary is in an amorphous state together with Si.

18. A multilayer ceramic capacitor comprising:
a plurality of first internal electrodes and a plurality of second internal electrodes that are alternately stacked with each other with dielectric layers therebetween,
wherein each dielectric layer comprises a plurality of dielectric grains with a grain boundary therebetween,
wherein the grain boundary has a thickness of 0.7 nm to 1.5 nm, and
wherein the grain boundary includes Ni and Ti, and a ratio Ni/Ti of a weight of Ni to a weight of Ti in the grain boundary is 0.1 or less.

19. The multilayer ceramic capacitor of claim 18, wherein the grain boundary further includes Si, and a ratio Si/Ni of a weight of Si to the weight of Ni in the grain boundary is at least 1 and 6 or less.

20. The multilayer ceramic capacitor of claim 18, wherein the dielectric grains of the dielectric layers have a structure including a core and a shell, and the core is free of Si and Ni.

21. The multilayer ceramic capacitor of claim 18, wherein the Ni included in the grain boundary is in an amorphous state together with Si.

* * * * *